June 13, 1972   R. L. NOVACK ET AL   3,669,752
METHOD OF OPERATING FUEL CELL
Original Filed April 4, 1966

ROBERT L. NOVACK
DAVID McLEOD MOULTON
WALTER JUDA, INVENTORS

Rines and Rines
ATTORNEYS

United States Patent Office

3,669,752
Patented June 13, 1972

---

3,669,752
METHOD OF OPERATING FUEL CELL
Robert L. Novack, Hanover, Mass., David M. Moulton, Knoxville, Tenn., and Walter Juda, Lexington, Mass., assignors to Prototech Company, a division of Bolt Beranek and Newman Inc., Cambridge, Mass.
Original application Apr. 4, 1966, Ser. No. 539,768, now Patent No. 3,471,334, dated Oct. 7, 1969. Divided and this application Aug. 4, 1969, Ser. No. 847,033
Int. Cl. H01m 27/00
U.S. Cl. 136—86                 5 Claims

ABSTRACT OF THE DISCLOSURE

Electrolytic cell operation in which the electrolyte is agitated near one of a pair of electrodes and a barrier is interposed between the electrodes and is physically combined with structure of one of the electrodes. The cell may have an alkali-metal hydroxide electrolyte maintained at a temperature of at least 300 degrees C. to render the electrolyte molten and anhydrous. Peroxide and superoxide may function as the electrochemical oxidant of the cell.

---

REFERENCE TO CO-PENDING APPLICATION

This application is a division of Ser. No. 539,768, filed Apr. 4, 1966, for "Fuel Cell Process and Apparatus," now Pat. No. 3,471,334.

BACKGROUND OF THE INVENTION

This invention relates to electrolytic cells and is more particularly concerned with a unique fuel cell operating method.

As explained in copending application of Moulton et al., Ser. No. 677,478, filed Oct. 23, 1967, now Pat. No. 3,471,335, a continuation of Ser. No. 376,916, filed June 22, 1964 (now abandoned), if an alkali-metal hydroxide electrolytic medium in contact with an oxygen-containing atmosphere is maintained at a temperature of at least substantially 300 degrees C. and sufficient to render the medium molten and substantially anhydrous, the peroxide and superoxide formed will function as substantially the sole fuel cell electrochemical oxidant to provide substantially the entire current output of the fuel cell.

In cells of the above-described character (and also in other types of electrolytic cells and electrochemical systems wherein similar phenomena occur), a region of the electrolytic or other cell medium is subjected to mechanical agitation for such purposes as ensuring an adequate and fresh supply of peroxide or superoxide near the cathode (or otherwise to further electrochemical reaction near one of the electrodes). This agitating action may be effected, in the above example, by the use of air which is introduced as a circulating stream in the region of the cathode. Though this agitation and resulting replenishment and circulation of peroxides and superoxides in the said region is desirable and even essential for efficient operation, it can prove highly deleterious to the overall operation of the cell if the agitation spreads to the region of the electrolytic medium near the anode. Similar remarks, of course, apply to related problems in other types of cells and electrochemical systems where agitation or the presence of high concentrations of certain constituents at one region of the cell are desirable to further electrochemical reactions thereat but prove deleterious to the intended electrochemical reaction in another region of the cell.

In the above example, the electrolyte of a medium temperature fuel cell, containing, say, a mixture of alkali hydroxides as of sodium and potassium hydroxide maintained in molten state at a temperature of the order of 450 degrees C., may be employed with nickel or similar cathodes to provide in the vicinity of the cathode, peroxide or superoxide that may serve as the oxidant for the cell. The circulating of air in the cathode region of the cell aids in presenting a fresh and continuous supply of peroxide or superoxide for this purpose. At the cathode region, the electrolytic medium is thus in effect oxidized to produce the peroxide or superoxide, giving off water. In the operation of the cell, that is, when a current is drawn, as explained in the said co-pending application, Ser. No. 677,478, the peroxide or superoxide ion is reduced by the addition of an electron in the presence of water back to the hydroxide ion of the molten electrolyte. At the anode, hydrogen fuel fed in, as through a Pd-containing hydrogen permeable anodic layer, is oxidized electrochemically, reacting with the hydroxyl ion of the electrolyte medium to generate water at the surface of the anode and releasing, during operation, an electron to the output circuit between the anode and the cathode.

If the agitation produced by the introduced air, otherwise so important for proper cathodic operation, extends to the region of the anode, however, excess peroxide or superoxide over that consumed at the cathode will be driven in considerable concentration to the region of the anode. The hydrogen supplied to the anode readily combines with such peroxide or superoxide and thus robs the cell of a substantial amount of otherwise useful hydrogen that is intended to be converted by the fuel cell action into output electrical energy. Alternately, the agitation within the electrolytic medium can mechanically bring back to the cathode the water generated in the vicinity of the anode, as previously described, and in sufficient quantity to interfere with, or even prevent, the effective generation of the required quantities of peroxide or superoxide adjacent the cathode.

BRIEF DESCRIPTION OF THE INVENTION

An object of the invention, accordingly, is to provide a new and improved method of operating an electrolytic cell, which not only overcomes the foregoing problems but also, by physically combining a barrier with the structure of one of the electrodes, constitutes a unique electrolytic cell structure with attendant advantages.

It is therefore a further object to provide a new and improved electrolytic or electrochemical cell operating method of general utility.

Other and further objects will be explained hereinafter and are more particularly delineated in the appended claims.

In summary, an electrolytic cell operated in accordance with the invention may have a plurality of electrodes and an electrolyte which is agitated near one of the electrodes to further the electrochemical reaction thereat. Barrier means is interposed between said one electrode and a second electrode, the barrier means being permeable to ions of the electrolyte and physically combined with the structure of one of the electrodes.

BRIEF DESCRIPTION OF THE DRAWINGS

The invention will now be described with reference to the accompanying drawings, in which.

DETAILED DESCRIPTION OF THE INVENTION

Figure 1:
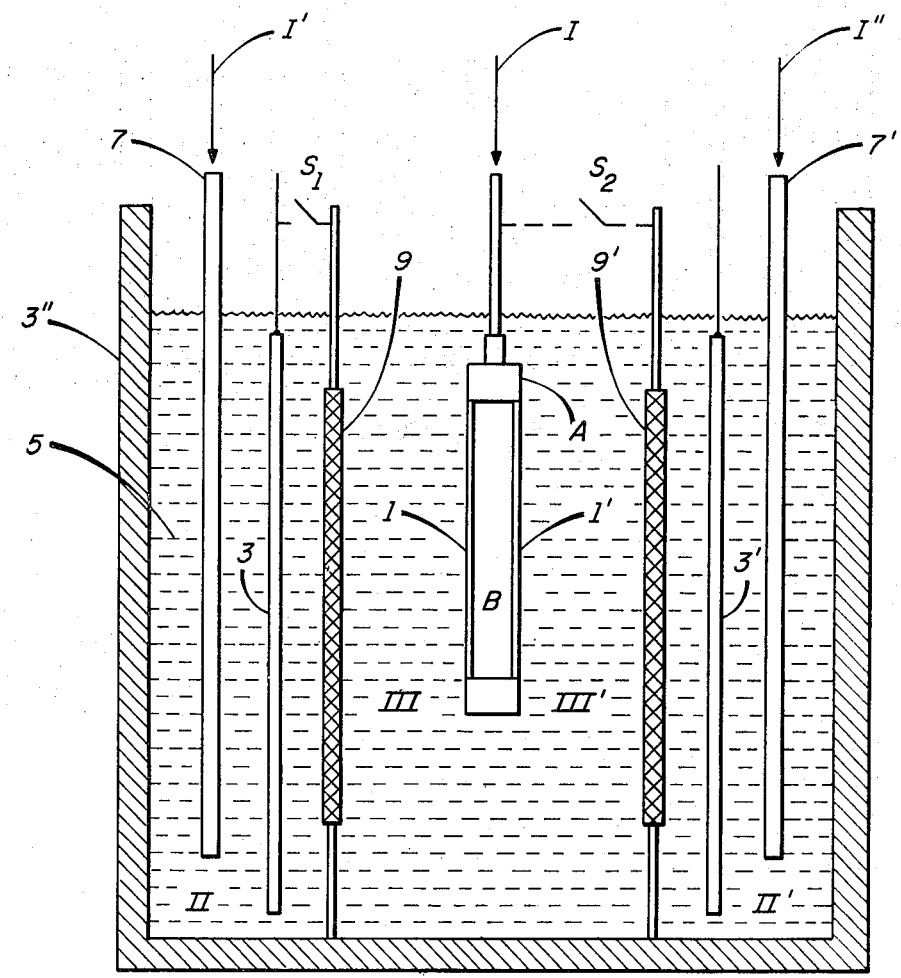
FIG. 1 is a schematic longitudinal section of a preferred embodiment with many details of conventional fuel cell construction, such as venting, heating, and related structures omitted to avoid detracting from the essential features of the invention.

Referring to the drawings, a fuel cell of the above-described character is illustrated comprising an anode assembly A that may embody a fuel reformation catalytic bed B, sandwiched between a pair of back-to-back hydrogen-permeable anodic foil electrodes 1 and 1', as described, for example, in co-pending application of Juda, Ser. No. 308,418, filed Sept. 12, 1963, now Pat. No. 3,407,094. A hydrogen and carbon containing fuel may be introduced as shown by the arrow I into the reforming bed B, and the resulting hydrogen may be utilized in the cell portions to the left and right of the anodes 1 and 1' within the electrolytic medium 5. As before stated, this medium may, for example, be combined sodium-potassium hydroxide molten electrolyte or any other suitable electrolytic medium, provided with a pair of similar cathodes, such as nickel electrodes 3 and 3', which, because of the operation of the cell on the superoxide or peroxide principle, may be of solid material and need not be porous. The agitating air may be introduced as at I' and I" at the extreme left- and right-hand regions of the double cell through tubes 7 and 7' at the sides of the cathodes 3 and 3' remote from anodes.

In accordance with the present invention, barriers or diaphragms 9 and 9' of rather critical construction are introduced between the anode 1 and cathode 3 and the anode 1' and cathode 3' of the double cells. The barriers 9 and 9' must be permeable to the ions of the electrolytic medium 5 and to this end may be of porous material, as later described. The porosity, however, or apertured nature of the barriers 9 and 9' must be sufficiently small and the barriers must be of sufficient dimensional area that the air-agitation in the regions of the medium 5 adjacent the cathodes 3 and 3', referred to as the catholyte regions II and II', cannot be transferred to the regions at the opposite sides of the barriers 9 as 9', facing the respective anodes 1 and 1', which may be referred to as the anolyte regions III or III'. Thus, with suitable ion-pervious but agitation-imprevious and suppressing barriers 9 and 9', the anolyte regions III and III' are maintained substantially quiescent relative to the agitated catholyte regions II and II'.

It has been found that the required ends may be admirably attained with either porous conductive or porous insulating barriers 9 and 9' under certain specified conditions. Typically, for example, the cell may comprise a nickel box or housing 3", divided by two barriers 9 and 9' mounted in slots (not shown) and dividing the box into three approximately equal compartments, the center compartment holding the anolyte, and the two outer compartments, the catholyte, and with the nickel box itself serving as the cathodes 3–3", 3'–3". The anode assembly 1–1' is, of course, inserted in the anolyte.

When porous metallic barriers 9 and 9' are used in conjunction with a peroxide-producing catholyte, they may either be maintained at a floating potential, as by electronically insulating them from both cathode and anode, or they may be cathodic by electrically connecting them to the cathode box, as later described.

A wide variety of metallic conducting barriers 9 and 9', moreover, have been found suitable, including metal felts, screens and sintered metal barriers; for example, nickel felts, sintered nickel sheets, nickel screens, and aluminum screens.

As an example, successful operation has been obtained in a cell employing sintered nickel barriers 9 and 9', about ⅛" thick and average porosity of between about 70 and 80 microns (the sintering having been effected in a hydrogen furnace). The cathodic box cell was made of ⅛" nickel and was about 1¾" wide, 2¼" long, and 5" deep. The anode was a palladium foil anode having an area of 29 cm.² The medium 5 was molten KOH-NaOH (90/10 ratio of moist pellets as received), operated at 450° C.±5° C. The sintered nickel barriers 9 and 9' were ⅛" thick, 3½" long and 1⅞" wide, and were supported by frames, made of nickel sheet 1/32" thick, adapted to fit into grooves milled into the box. When air was circulated at 7 and 7' at a flow rate of 500 ml./min. (measured at 20° C.), the anode surface 1 and the barrier surface 9 could be brought to as close as approximately 5 mm. and closer, while still permitting air flow rates or other agitation of the catholyte II of the order of the said 500 ml./min. without deleteriously affecting the operation at the anode 1; that is, without significant agitation of the anolyte III. Such close spacing, of course, enables reduction in the necessary size of the cell.

To illustrate the effect of the barrier in this example, the sintered nickel barriers were removed and the operation of the cell without the barriers was compared with the operation with the barriers. Table I shows the results, giving the voltage-current characteristics as well as electrochemical hydrogen utilization.

TABLE I.—DISCHARGE DATA

| Cell voltage | Current density, ma./cm.² | Hydrogen efficiency, percent |
|---|---|---|
| No barriers | | |
| .985 | 0.00 | |
| .940 | 26 | 20 |
| .915 | 35 | 26 |
| .805 | 45 | 37 |
| .600 | 52 | 43 |
| Sintered nickel barriers—connected to cathode | | |
| 1.040 | 0.00 | |
| 1.005 | 28 | 36 |
| .975 | 45 | 42 |
| .935 | 66 | 47 |
| .900 | 90 | 55 |
| .860 | 114 | 61 |
| .790 | 147 | 65 |
| .755 | 166 | 71 |
| .680 | 211 | 79 |

The hydrogen utilization was measured by measuring the flow rate of hydrogen in and out of the cell. The difference between the two flow rates gives the total volume of hydrogen per unit time consumed in the cell, that is, the sum of the electrochemical consumption and the chemical reaction with the peroxide. The column labeled "Hydrogen Efficiency" represents the ratio of hydrogen electrochemically utilized per unit time (calculated from the current) to the total hydrogen consumed per unit time multiplied by 100. It should be noted that the hydrogen utilization (efficiency) is much greater with the barrier and greater power densities are obtained, with power density remaining high at the higher currents.

In another example, nickel screen barriers 9, of about the same length and width (50 mesh, 0.020" thick) were used and electrically connected to the cathode, as indicated by the dotted connection $S_1$. It was found that the barriers not only then served the required function of the barrier, but added to the effective surface area of the cathode and/or decreased the internal cell resistance, thereby decreasing cell polarization, as shown in Table II.

TABLE II.—NICKEL SCREEN BARRIERS

| | Barriers floating | Barriers connected to cathode |
|---|---|---|
| Current density, ma./cm.² | 146 | 153 |
| Cell potential, v. | 0.81 | 0.85 |

In the limiting case, the barrier itself can act as the sole cathode. While we do not wish to be limited to any particular theory, such cathodic barriers as, for example, sintered nickel sheets or fine mesh nickel screens, have been found advantageous. This is apparently because they reduce peroxide electrochemically within their pores, thereby reducing peroxide concentration in the anolyte which would result from diffusion through a non-cathodic barrier.

Similarly, insulating porous barriers, such as ceramic materials of zirconium oxide and aluminum oxide and the like (in the form of sheets or thimbles or the like) have been found to be successful for solving the above problem. A zirconium dioxide barrier 9 of this character, about ¼" thick with a porosity of about 11.6%, for example, was found to be successfully operative in the above-described cell.

Composite barriers of metal and ceramic materials of the previously described critical construction were also found to be suitable for the purposes of this invention. For example, flat nickel and aluminum screen baskets with and without powdered or granular metal, e.g., nickel or aluminum, and powdered paste or granular ceramic materials, for example, $Al_2O_3$, $ZrO_2$, or MgO, providing the desired porosity, have also been successfully employed.

By way of illustration, the performance of a typical composite barrier of a nickel screen basket filled with alumina granules (20/40 mesh) is shown in Table III:

TABLE III

Composite nickel screen-alumina barriers (electrodes, melt and temperature same as Table I)

| | |
|---|---|
| Cell voltage | 0.88 |
| Current density (ma/cm.$^2$) | 102 |
| Hydrogen efficiency (percent) | 90 |

Figure 2:
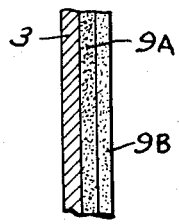
FIG. 2 is a fragmentary sectional view showing the barrier combined with the cathode.

Another suitable composite barrier, shown in FIG. 2, consists of two successive porous layers 9A and 9B, for example, cathodic sintered nickel barrier (which may be combined with or constitute the cathode as noted above) and a porous alumina barrier, the former helping to lower peroxide diffusion and the latter further immobilizing the anolyte, for example, if the cell is to be subjected to movement, as in a vehicle.

In general, any means of substantially immobilizing the electrolyte layer adjacent to the anode while permitting agitation of the electrolyte in the vicinity of the cathode, while permitting ion permeation, constitutes a suitable barrier for the purposes of this invention. Thus, as an alternative to the above-described barriers, a layer of porous metal, for example, nickel, may be formed on the face of the anode, in electronic contact therewith, schematically illustrated by the dotted switch connection $S_2$. In this case, the porous nickel is part of the anode and can contribute to its performance as an electro-catalyst for electrochemical hydrogen oxidation, while maintaining the molten electrolyte stagnant in its pores. The water formed therein during operation is removed substantially by diffusion, rather than by mechanical agitation. Still another means of accomplishing the same objective consists in inserting a porous layer of ceramic insulating material, e.g., of $Al_2O_3$ or $ZrO_2$, for example, in contact with or in the vicinity of the anode. While such layer introduces some extra internal resistivity, it serves the purpose of immobilizing the anolyte within its pores and it has the additional advantage of permitting close spacing of cathode and anode without danger of electrical shorting.

The barrier preferably extends over an area not less than one third and often commensurate with the area occupied by the anode. In some cases, it may extend completely across the housing of the cell itself. The area of barrier is chosen as a compromise between its effectiveness in controlling agitation and the change in internal resistance of the cell resulting from its nature, thickness, and porosity. In general, the barrier must be of sufficient size mechanically to shield the anode from the agitation of the medium at the cathode region and yet large enough to keep the internal electrolyte resistance low.

Further modifications will occur to those skilled in the art and all such are considered to fall within the spirit and scope of the invention as defined in the appended claims.

What is claimed is:

1. A method of operating a fuel cell containing an alkali-metal hydroxide electrolytic medium between an anode and a cathode, that comprises maintaining the medium at a temperature of at least substantially 300° C. and sufficient to render the medium molten and substantially anhydrous and in contact with an oxygen-containing atmosphere in an amount sufficient to provide in the medium at least one of alkali-metal peroxide and superoxide, said peroxide and superoxide functioning as substantially the sole fuel cell electrochemical oxidant, combining with the structure of said cathode a barrier, agitating the region of the medium at the side of the cathode remote from the anode to promote the formation or replenishment of said oxidant, impeding the transfer of such agitation through said barrier to the opposite side of said cathode while permitting the passage of ions of said medium through said barrier from one side of said cathode to the other, whereby said peroxide and superoxide may be electrochemically utilized at said cathode, applying hydrogen-containing fuel to the fuel cell, and drawing current therefrom while holding the said medium at such temperature and while utilizing said oxidant electrochemically to provide substantially the entire current output of the fuel cell.

2. A method as claimed in claim 1 and in which said barrier also functions as the cathode.

3. A method as claimed in claim 1 and in which the combining of the barrier with the structure of the cathode comprises providing a porous barrier layer for the cathode.

4. A method as claimed in claim 3 and in which successive porous layers are provided.

5. A method as claimed in claim 3 and in which a conductive layer is provided.

References Cited

UNITED STATES PATENTS

| | | | |
|---|---|---|---|
| 555,511 | 3/1896 | Jacques | 136—84 |
| 1,572,403 | 2/1926 | Mershon | 136—140 |
| 3,098,802 | 7/1963 | Beer | 204—231 X |
| 3,215,562 | 11/1965 | Hindin | 136—86 |
| 3,242,010 | 3/1966 | Bodine | 136—86 |
| 3,247,024 | 4/1966 | Tamminen | 136—140 |
| 3,382,103 | 5/1968 | Smith | 136—86 |
| 3,433,675 | 3/1969 | Moulton | 136—86 |

FOREIGN PATENTS

| | | | |
|---|---|---|---|
| 171,090 | 5/1906 | Germany | 136—164 |

ALLEN B. CURTIS, Primary Examiner